Nov. 12, 1929.　　　V. A. STEWART　　　1,735,021

BIFOCAL SPECTACLES

Filed May 15, 1925

Inventor
Victor A. Stewart
By his Attorneys

Patented Nov. 12, 1929

1,735,021

UNITED STATES PATENT OFFICE

VICTOR A. STEWART, OF NEW YORK, N. Y.

BIFOCAL SPECTACLES

Application filed May 15, 1925. Serial No. 30,412.

The invention relates to spectacles having lenses of the bi-focal type wherein the reading glass portion of the lenses may be adjusted as desired between a lower position which will be used for reading purposes and an upper position wherein they will be out of the ordinary line of sight.

One object of the invention is to provide spectacles of the above type in which the lenses may be easily moved from one position to the other but yet will be effectively held against accidental displacement when once they are adjusted.

Further objects and advantages of the invention will be in part obvious and in part specifically pointed out in the description hereinafter contained which taken in connection with the accompanying drawings, discloses a preferred embodiment thereof. Such embodiment, however, is to be considered merely as illustrative of its principles.

In the drawings—

Figure 1:
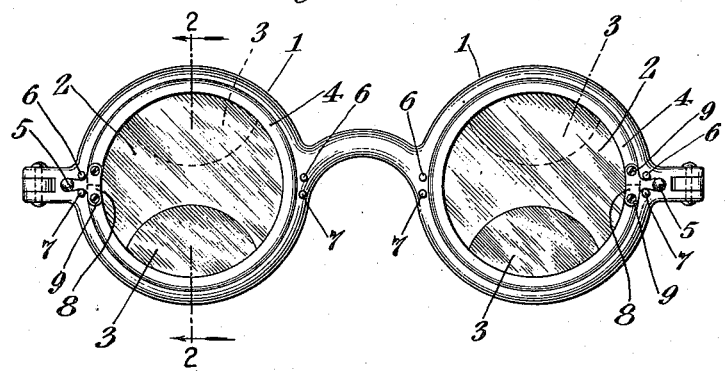
Fig. 1 is a front elevation of a pair of spectacles constructed in accordance with the invention.
Figure 2:
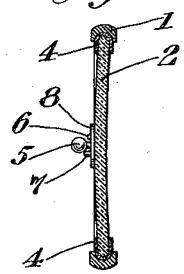
Fig. 2 is a transverse section through one of the spectacles.

The invention as illustrated is applied to spectacles having a frame of any suitable nature provided with rims 1 and lenses 2 with their bi-focal portions 3. Each of the lenses is held within what I term a rider 4 which preferably consists of a piece of sheet metal bent around into annular form over the peripheral edges of the lenses and fitting rotatably within the rim 1.

In accordance with the present invention a snap fastening device is provided between the rider 4 and the rim to hold the lenses in properly adjusted position.

As shown the rider 4 has a finger piece 5 attached thereto and projecting outwardly therefrom so as to engage between lugs 6 and 7 at diametrically opposite points on the rim 1. When it is desired to shift the lenses the finger piece 5 will be forced over lug 6 and moved around through an arc of 180° until it snaps into position between the diametrically opposite lugs 6 and 7, the finger piece being sufficiently resilient to enable it to be moved past lug 6 as aforesaid, but yet holding the lens in proper position against ordinary accidental displacements. As shown, the lug 7 is somewhat larger than lug 6, and forms a positive stop against further rotation.

In the illustrated form of the invention the finger piece 5 is provided with a base 8 overlapping and secured to the meeting ends of the rider 4, as by screws 9, thus serving to hold the ends of the rider in proper relation to each other.

While a specific embodiment of the invention has been disclosed, it will be obvious that changes may be made therein without departing from its essentials as defined in the following claims.

I claim:

1. Spectacles having a frame including a rim, a rider rotatably mounted within said rim and supporting a lens, of the bi-focal type, said rider and frame having parts engaging to form a snap fastening device for holding the reading glass portion of the lens in raised or lowered position.

2. Spectacles having a frame including a rim, a rider rotatably mounted within said rim, and supporting a lens of the bi-focal type, a finger piece projecting outwardly from said rider, said frame having sets of spaced lugs disposed at substantially diametrically opposite points thereon and between which said finger piece may be selectively snapped to hold the reading glass portion of the lens in raised or lowered position.

3. Spectacles having a frame including a rim, a rider comprising a split ring rotatably mounted in said rim, and supporting a lens of the bi-focal type, a finger piece extending outwardly from said rider and having a base secured to the ends thereof, and means disposed at substantially diametrically opposite points on said frame and cooperating with said finger piece to form snap fastening devices for holding the reading glass portion of the lens in raised or lowered position.

In testimony that I claim the foregoing, I have hereunto set my hand this 23rd day of April, 1925.

VICTOR A. STEWART.